United States Patent Office 3,195,947
Patented July 20, 1965

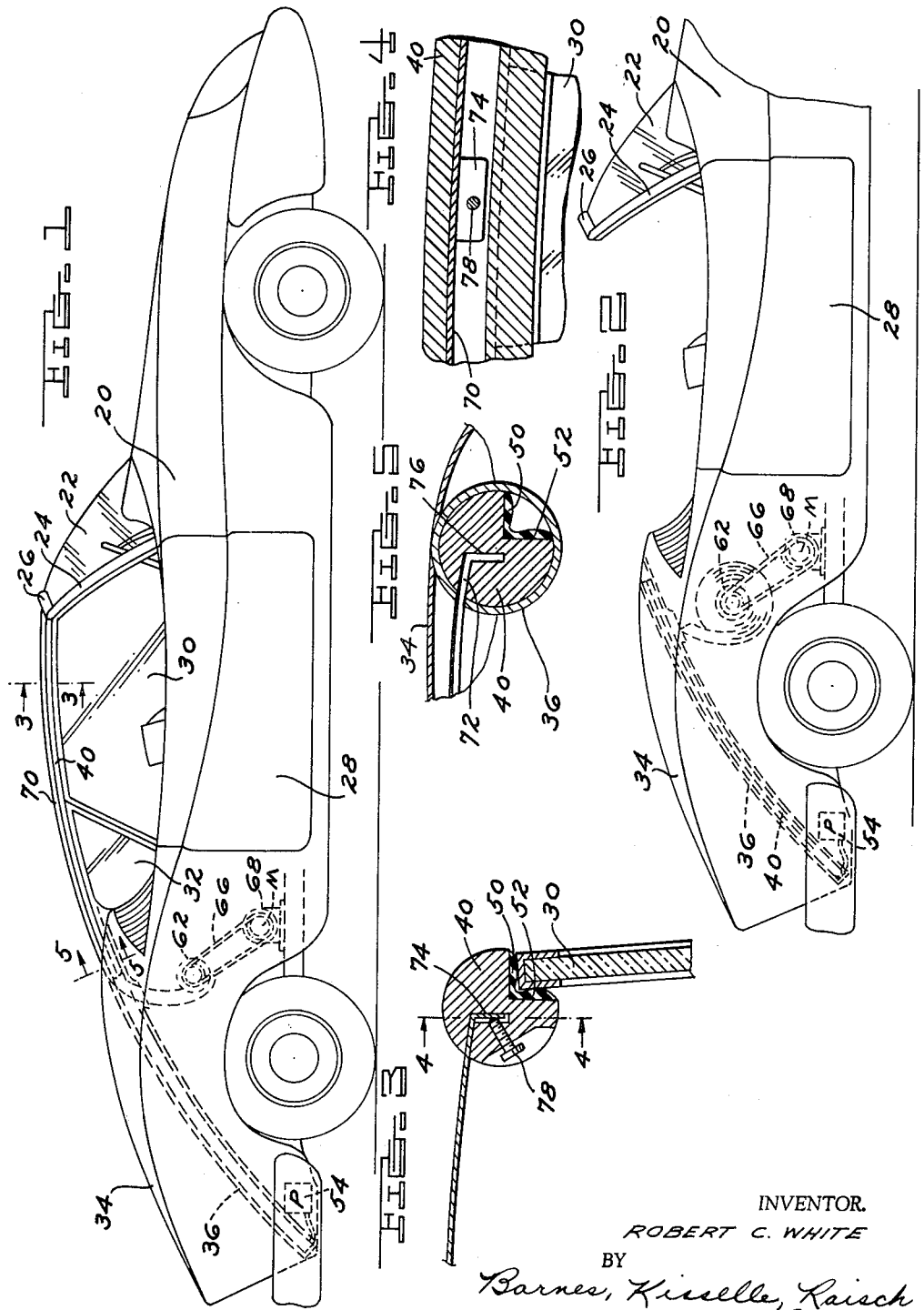

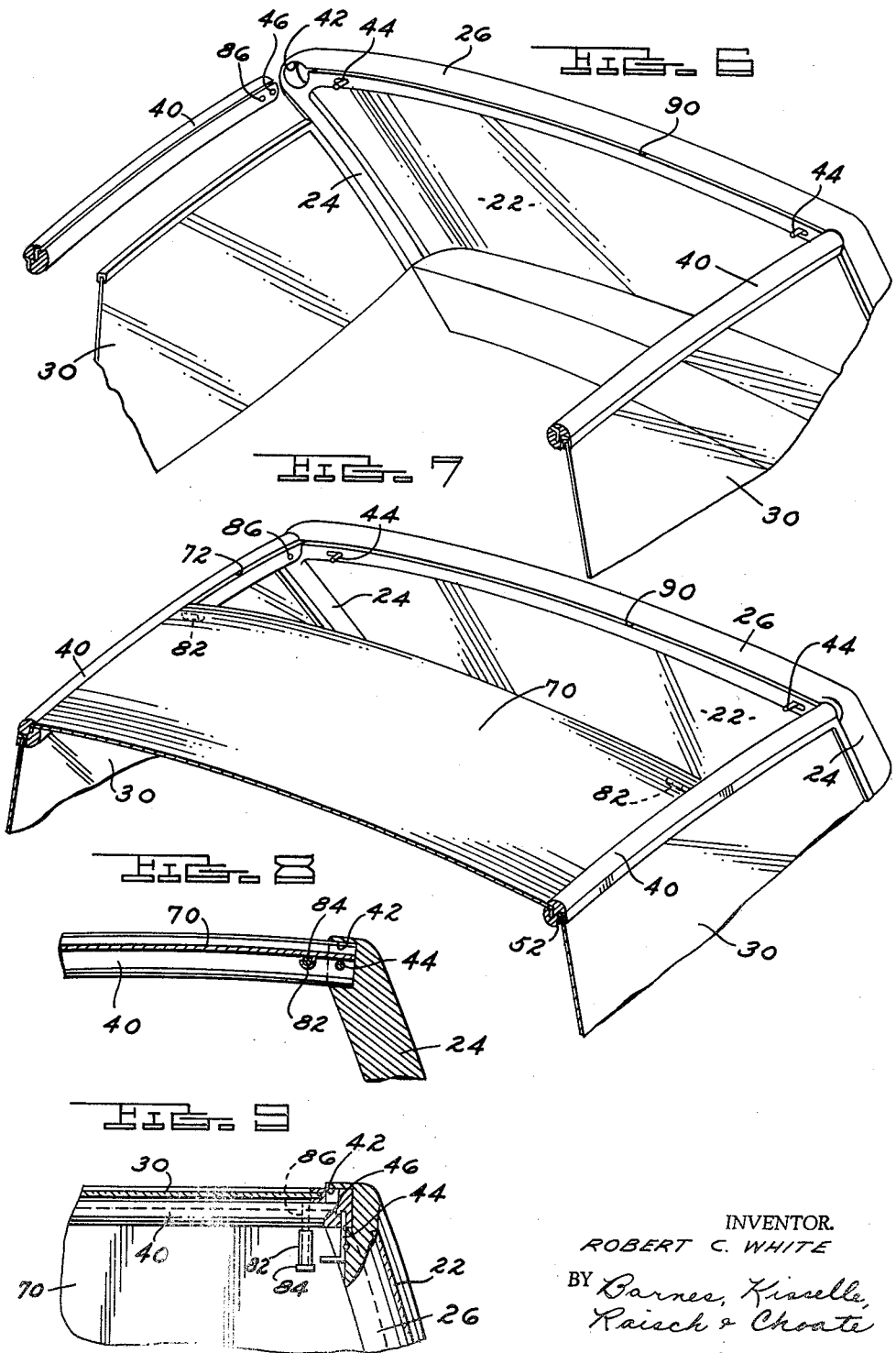

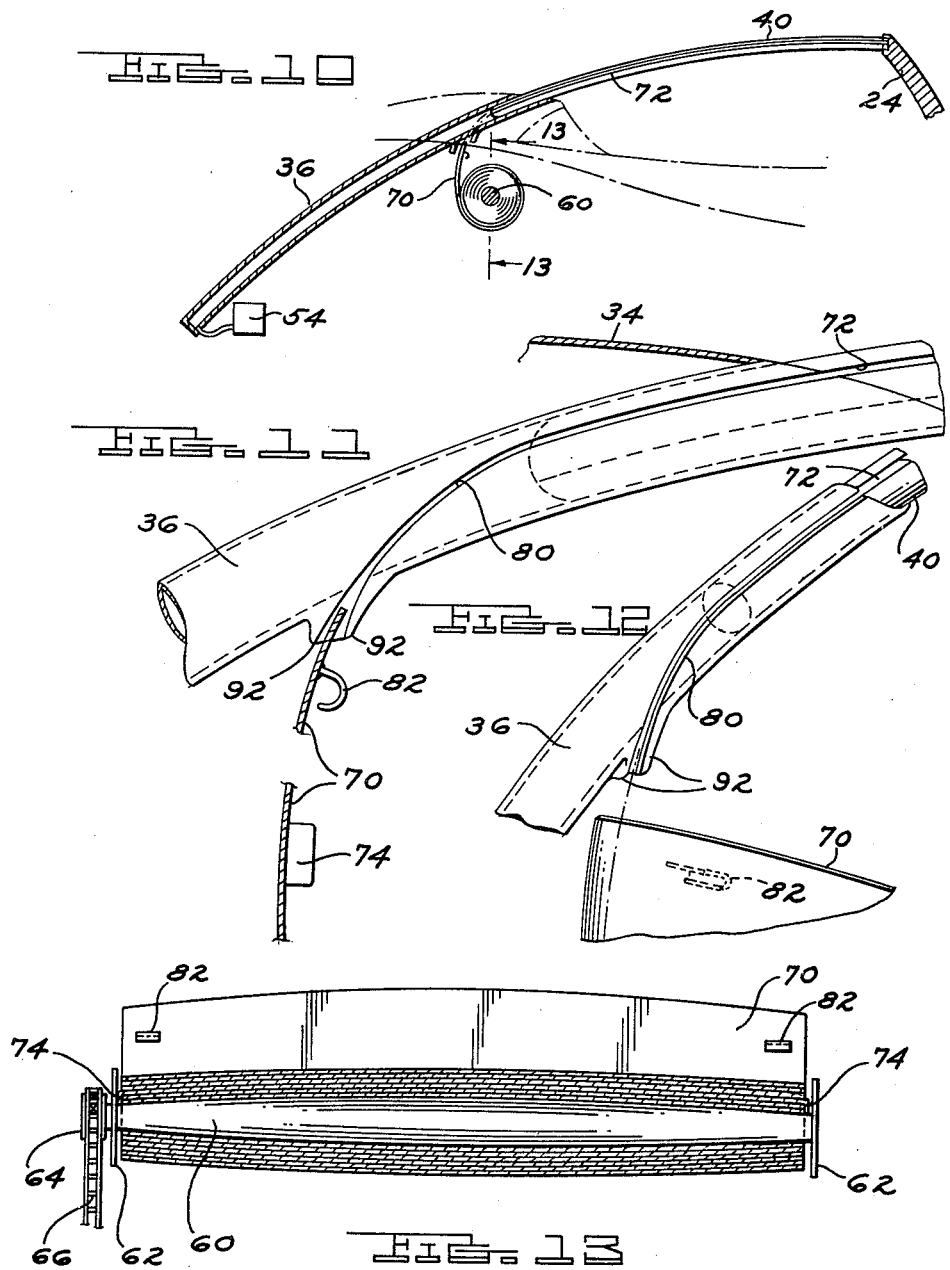

3,195,947
CONVERTIBLE TOP
Robert C. White, 26000 Capitol Ave., Detroit 39, Mich.
Filed Apr. 20, 1962, Ser. No. 189,039
2 Claims. (Cl. 296—107)

This invention relates to a convertible top for vehicles.

It has been common, of course, to use convertible tops formed of a fabric. It is also known to use a so-called "hardtop" convertible wherein the metal tops are retractable into the trunk as a solid unit. This latter construction reduces the luggage space in the trunk and has other disadvantages with respect to expense of construction, sealing at the top edges, and so on.

It is an object of the present invention to provide a convertible top for passenger vehicles which is formed of a corrosion resistant material such as stainless steel or a durable, highly resilient plastic sheet so that it is a permanent fixture for the vehicle; and it is a further object to provide a top which can be moved into the complete covering position and locked in place or rolled back into a storage position without interfering with the luggage space of the vehicle.

It is another object to provide a top which can be opened to a point between the storage position and the full-covering position as a so-called "sun roof" position.

It is a further object to provide a constuction which locks at the front and the sides of the vehicle while permitting the windows of the vehicle to be opened and closed without disturbing a sealing relationship between the top construction and the side of the windows when it is desired.

Another object of the invention is the use of side rails for the vehicle which can be permanently in place or which can be retracted, these rails having cooperation with the top and the windows of the vehicle.

A further object is the provision of an operating mechanism for the structure which makes it possible to have automatic retraction and ejection if this is desired.

Other objects and features of the invention relating to details of construction and operation will be apparent in the following description and claims.

Drawings accompany the disclosure and the various views thereof may be briefly described as:

FIGURE 1, a view of a vehicle showing the top in closed position.

FIGURE 2, a partial view of the vehicle showing the top in retracted position.

FIGURE 3, a sectional view on line 3—3 of FIGURE 1.

FIGURE 4, a sectional view on line 4—4 of FIGURE 3.

FIGURE 5, a sectional view on line 5—5 of FIGURE 1.

FIGURE 6, a close-up perspective view of the top side rails and windshield.

FIGURE 7, a similar view showing the top approaching full closure.

FIGURE 8, a deailed vertical section showing the windshield header.

FIGURE 9, a detailed horizontal section from the inside of the car showing the locking mechanism.

FIGURE 10, a view of the side rail assembly.

FIGURE 11, a detail of the side rail assembly showing the top track groove.

FIGURE 12, a perspective view of the structure shown in FIGURE 11.

FIGURE 13, a longitudinal section through the storage roller for the convertible top.

To decribe the invention briefly in general terms, the concept involves the use of a sheet of material which has sufficient flexibility that it can be rolled up in the same manner as a metallic measuring tape. The sheet is formed in normal contour with an inherent concave, convex shape, that is, curved in lateral cross-section so that when extended it has a certain mount of stiffness and resistance to buckling. A roller is provided directly behind the back seat of the car for storing this flexible sheet and side arms are also provided along the top of each side of the car to engage the edges of the top so that it may have a sealing relationship with respect to the windshield structure and the windows of the vehicle.

Referring to the drawings, in FIGURE 1 a vehicle is shown having a body 20 with a windshield 22, provided with side pillars 24 and a cross header portion 26. A vehicle door 28 has a window 30 and behind the door on each side is a rear side window 32. On each side of the trunk area 34 within the car body is a storage tube 36 which has a longitudinal curvature similar to the curvation of the top. Each of these storage tubes on each side of the vehicle receive, telescopically, a slidable side bar 40 of substantially round cross section, the side bars having a sufficient length that they are moved up to the windshield header where the forward end of the side bars will be received in holes 42. An L-shaped lock 44 with a suitable detent control engages a hole 46 on the inside of the bars 40 to lock the bars into the header. When the forward end of the bars 40 is locked in the header, the rear end is still anchored in the forward end of the tubes 36 so that the bars are stabilized in the vehicle body. The bars 40 have a segmental groove 50 on the lower outside quarter which is lined with a suitable sealing material 52 for engagement with the top edges of the vertically retractable windows of the vehicle (see FIGURE 3).

To facilitate the ejection of the side bars 40, a source of fluid pressure, such as an air pump 54, is provided in pneumatic connection with the bottom end of the tubes 36. Thus, with a suitable remote control for pump 54 air can be introduced into the pneumatic tubes 36 and the bars will be projected upwardly and outwardly to the fixed position just described.

Referring now to the top element, in FIGURE 13 this top is shown mounted on a roller 60 mounted in brackets 62 behind the back seat area of the vehicle. The roller has a shape which tapers outwardly from each end to an enlarged mid-section and at one end of the roller is a suitable drive pulley 64 to be actuated by a chain or belt 66 driven by a motor 68 (see FIGURE 1) which can be controlled from the dashboard of the vehicle. The sheet top 70 is preferably a stainless steel or other corrosion resistant material which has a rather high degree of flexibility so that it may be rolled on a diameter ranging from perhaps 2½" to 6". The sheet is formed with a material contour which is concave on the bottom and convex on the top so that when the sheet is pulled forward, it has a transverse crown. The sheet also has a limited flexibility in the longitudinal dimension without a buckling action so that the roof formed by the extended sheet is crowned both longitudinally and transversely.

The edges of the sheet 70 are guided by an inverted L-shaped groove 72 shown best in FIGURES 3 and 5. The horizontal leg of the groove adjacent the suface is designed to carry the edge of the sheet 70 which is provided at spaced intervals with short locking flanges 74 which travel in the inside vertical leg 76 of the groove 72. At intervals along the bars 40 a recessed screw 78 is provided to screw into the slot 76 to lock the flanges 74. Thus, the bar locks the edges of the sheet against motion in any direction except longitudinal.

It will be seen in FIGURE 11 that the tube 36 has a side groove 80 for receiving the forward edge of the top and this groove serves to thread the edges of the top into the groove 72 of the bars 40. A short locking bracket 82 at the forward end of the sheet 70 cooperates with a locking plunger 84, which projects through the brackets 82 to a hole 86 at the forward end of the bars 40 to lock the top in place adjacent the windshield header.

The cross header 26 has a curved groove 90 which receives the forward end of the sheet 70 as it moves forward into the fully extended position.

In the operation of the device, it will be seen that in FIGURE 2 the entire top assembly is retracted. To place the top in a covering position, pressure is applied from the source 54 to the bottom of the tubes 36, and this pressure ejects the bars 40 to the point that they can be inserted into the holes 42 in the windshield header and locked in place by the pins 44. These bars can also be manually withdrawn. The motor 68 can then be actuated to rotate the roller 60 through the belt 66 and the pulley 64 in a clockwise direction as viewed in FIGURES 1 and 2. This rotation moves the leading edge of the sheet 70 into the groove 80, this leading edge being guided by some retaining fingers 92 (FIGURE 11). The edge of the sheet 70 then feeds into the groove 72 of the bars 40 and the sheet moves forward to the fully covering position with the leading edge engaged in the groove 90 and the locking brackets 82 pinned adjacent the holes 86.

In this position the covering sheet is fully stabilized by the groove 90 and the side groove 72 and locked by the flanges 72 along its length so that it is in a sealed and stable position. This construction prevents ballooning or collapse of the top because of the crowned relationship and in the forward position it is a firm and weatherproof cover. Retraction of the top can be accomplished by reversal of the motor 68 to cause re-rolling of the sheet 70. Manual retraction of the bars 40 into the tubes 36 completes the conversion to fully open car. If desired, an opening covered with a flexible transparent material can be placed in the top to serve as a rear window.

What I claim is:

1. A vehicle body combination for providing a retractible cover for a vehicle passenger compartment while maintaining a free space above said compartment, when desired, comprising:
    (a) a vehicle body having a passenger compartment with vertically adjustable side windows and a storage area adjacent said compartment,
    (b) side rails retractibly positionable in parallel relation along the sides of said compartment above the windows having a sealing recess to receive the top edges of said windows and positioned to receive support and rigidity from said windows, said rails having an L-shaped slot along one side facing the passenger compartment,
    (c) a sheet of flexible material having a shape retaining quality formed with an inherent transverse camber having at each longitudinal edge a plurality of spaced tabs receivable and slidable in said slots, said sheet being rollable into said storage area of said vehicle,
    (d) means in said storage area of said vehicle to move said sheet into a roll, and
    (e) means on said rails to lock said tabs releasably in position when said sheet is projected over said passenger compartment with the edges thereof in said slots of said rails.

2. A vehicle body combination for providing a retractible cover for a vehicle passenger compartment while maintaining a free space above said compartment, when desired, comprising:
    (a) a vehicle body having a passenger compartment with vertically adjustable side windows and a storage area adjacent said compartment,
    (b) a sheet of flexible material having a shape retaining quality formed with an inherent transverse camber having edges to lie adjacent the upper edges of the side windows when in fully closed position, said sheet being rollable into said storage area of said vehicle,
    (c) means in said storage area of said vehicle to move said sheet into a roll,
    (d) projectable means having a storage position in said body and movable to a position between the side edges of said windows in fully closed position, and the side edges of said sheet, said projectable means being shaped to interengage said sheet and the top edges of said windows, and
    (e) means to lock the side edges of said sheet in said projectable means.

References Cited by the Examiner

UNITED STATES PATENTS

| 2,013,314 | 9/35 | Metz | 296—107 |
| 2,328,263 | 8/43 | Stefano | 160—23 |
| 2,623,779 | 12/52 | Catell | 296—107 |
| 3,116,097 | 12/63 | Novales | 312—297 |

FOREIGN PATENTS

| 199,869 | 7/23 | Great Britain. |
| 772,386 | 4/57 | Great Britain. |
| 759,960 | 12/33 | France. |

A. HARRY LEVY, *Primary Examiner.*

PHILIP ARNOLD, *Examiner.*